A. M. AHERN.
ANIMAL TRAP.
APPLICATION FILED JULY 6, 1915.
1,174,535.
Patented Mar. 7, 1916.
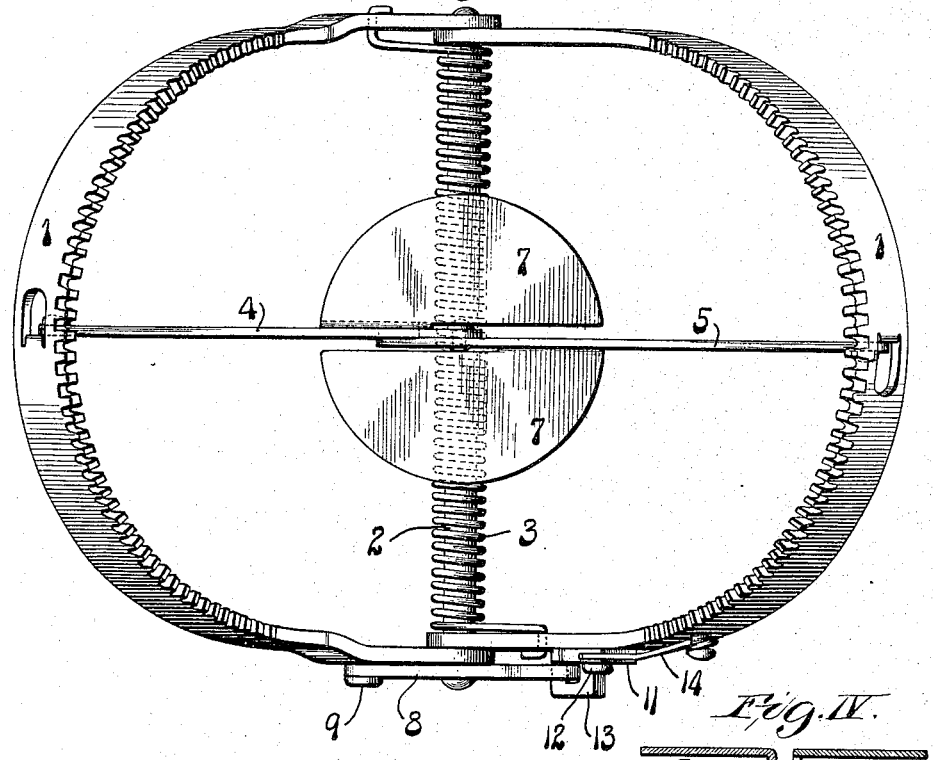
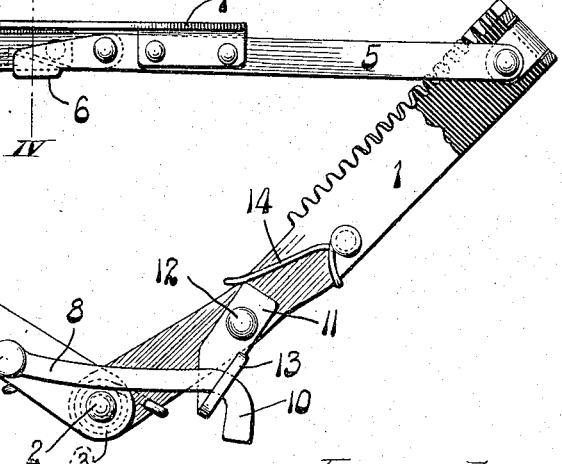
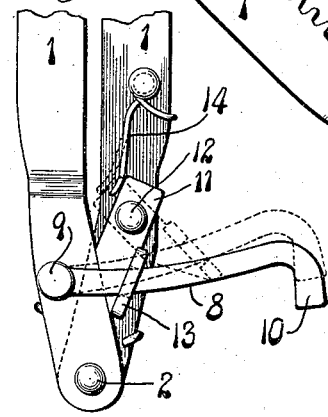
Inventor:
A. M. Ahern
by Knight & Cook attys.

UNITED STATES PATENT OFFICE.

ALBERT M. AHERN, OF ST. LOUIS, MISSOURI.

ANIMAL-TRAP.

1,174,535.　　　　　Specification of Letters Patent.　　Patented Mar. 7, 1916.

Application filed July 6, 1915. Serial No. 38,161.

*To all whom it may concern:*

Be it known that I, ALBERT M. AHERN, a citizen of the United States of America, a resident of the city of St. Louis, State of Missouri, have invented certain new and useful Improvements in Animal-Traps, of which the following is a full, clear, and exact description, reference being had to the accompanying drawing, forming a part of this specification.

My invention relates to an improvement in traps for capturing wild animals, and has for an object the provision, in a trap of this kind, of a locking device for preventing the opening of the trap jaws after they have closed upon the foot or leg of an animal, thereby eliminating the possibility of the release of the animal due to separation of the jaws.

A further object of the invention is to provide a toggle setting device in such a trap composed of links each of which is furnished with a pan element, whereby the pan of the trap may be located above the toggle instead of beneath it.

Figure I is a top view of my trap in open condition. Fig. II is a side view of the trap, open, one of the jaws being partly broken away and in cross section. Fig. III is a side view of the lower portion of the trap as it appears when the trap is closed. Fig. IV is a cross section taken on line IV—IV, Fig. II.

In the drawings, the jaws 1 which I have shown are of U-shape, and are joined by a pivot rod 2 surrounded by a spring 3 which tends to move the jaws toward each other to close the trap.

The setting device for holding the jaws open comprises a pair of links 4 and 5 pivoted to the jaws at their outer ends and having their inner ends pivoted to each other. These links form a toggle by which the jaws are held in spread positions, one of the links being provided with a stop member 6 for engagement with the other link to limit the outward movement of said toggle.

Each toggle link has secured to it a pan section 7 located opposite the pan section carried by the other link, the said pan sections occupying positions approximately coincident with the pivotal connection between the toggle links. It will be apparent that the trap may be sprung by pressure upon either or both of said pan sections.

8 designates a locking arm pivoted to one of the jaws 1 at 9, the said arm being provided, at its free end, with a hook or abutment 10.

11 is a dog pivoted to the other jaw at 12, and formed with a laterally extending eye 13 in which the locking arm operates. A spring 14 is fastened to the jaw that carries the dog 11, the said spring being arranged in engagement with the heel of said dog and adapted to bear either against the side or end of the said heel according to the position to which the dog is moved.

When the trap is to be opened and set the dog 11 is moved into the position indicated in dotted lines Fig. III and said dog will then move readily along the locking arm 8 extending through the eye of the dog. At such time the dog is held in the position mentioned due to the spring 14 resting against the end of the heel of the dog, but when the eye 9 strikes the abutment 10 at the end of the locking arm the said abutment causes the dog to be moved inwardly to the position seen most clearly in Fig. II. The trap being then sprung, no interference is offered by the dog and locking arm to the approach of the jaws toward each other and the jaws may, therefore, close upon the leg of an animal which has stepped upon the pan of the trap. As the jaws come close to each other during the closing of the trap, the dog 11 becomes adjusted to the inwardly inclined position seen in full lines Fig. III, and is then so disposed relative to the locking arm as to firmly grip it and prevent the outward movement of the trap jaws relative to each other. The adjustment of the dog 11 at this time is occasioned by pressure of the spring 14 against the side of the dog nearest the jaw by which the locking arm is carried. The spring then holds the dog in the full line position, Fig. III, so that the top and bottom walls of the opening in the eye 13 on the locking arm impinge against the top and bottom faces of said arm. With the parts in such positions any attempt to spread the jaws results in a tendency to move the locking arm and dog into alinement with each other, but as such action is rendered impossible, due to impingement of the top and bottom walls of the eye opening against the arm, there can be no separation of the jaws.

I claim:—

1. An animal trap comprising a pair of pivotally connected jaws, a locking arm carried by one of said jaws, and a dog carried by the other jaw adapted to grip said arm when the trap is closed.

2. An animal trap comprising a pair of pivotally connected jaws, a locking arm carried by one of said jaws and having an abutment at its free end, and a dog pivoted to the other jaw adapted to be moved by the abutment on said arm and to grip said arm when the trap is closed.

3. An animal trap comprising a pair of pivotally connected jaws, a locking arm pivoted to one of said jaws, and a dog pivoted to the other jaw, the said dog being provided with an eye in which said arm is operable, and which is adapted to grip said arm when the trap is closed.

ALBERT M. AHERN.

Copies of this patent may be obtained for five cents each, by addressing the "Commissioner of Patents, Washington, D. C."